March 30, 1943. F. A. PARKHURST 2,315,477
APPARATUS FOR FORMING SHEETS OF PLASTIC MATERIAL
Filed March 3, 1938
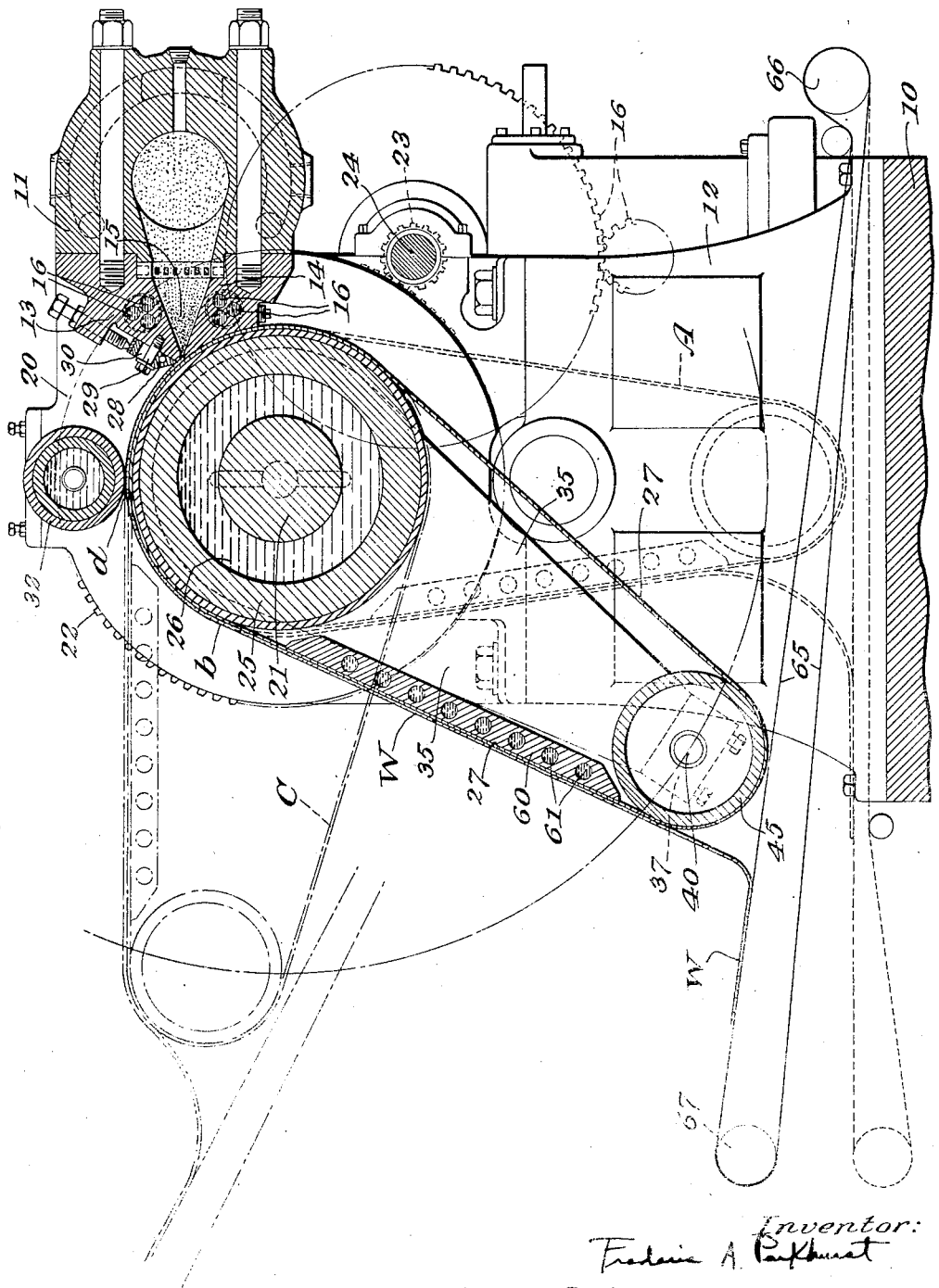
Inventor:
Frederic A. Parkhurst
By Dike, Calver & Gray
Attorneys Patented Mar. 30, 1943

2,315,477

UNITED STATES PATENT OFFICE 2,315,477

APPARATUS FOR FORMING SHEETS OF PLASTIC MATERIAL

Frederic A. Parkhurst, Bethesda, Md., assignor, by mesne assignments, to Monsanto Chemical Company, a corporation of Delaware Application March 3, 1938, Serial No. 193,705

8 Claims. (Cl. 18—12)

The present invention relates to apparatus for forming a continuous web of plastic material in which the plastic material is formed into a web while heated to substantially fluid condition. More particularly, the invention relates to the formation of a web of plasticized polyvinyl acetal resin from which pieces may be cut for use in the arts, and particularly, in the manufacture of laminated glass, such as is employed in motor vehicles. To give to this material the qualities which are desirable if it is to be used as an inner layer for laminated glass certain compatible plasticizers must be mixed with it.

Plasticized polyvinyl acetal resin of the kind described has certain peculiar physical properties which render its formation into a web by a continuous process extremely difficult. It is extremely tenacious of any included solvent and solvent cannot be removed by seasoning within any time which is commercially practical. It is very rubbery but after being stretched returns very slowly to its original dimensions. It is also extremely tacky and adheres tenaciously to any support with which it contacts. The pull necessary to loosen it from a support elongates the sheet, reduces its thickness or width or both and sets up within the sheet internal stresses which persist for a long time and which may be released during subsequent manipulation of the sheets. The release of these internal stresses manifests itself in variations in gauge, warping and shrinkage which seriously diminish the utility of the sheets made from the material. Furthermore if the attempt is made to produce the sheet by any process which involves handling the tacky material over rolls or the other supports, particularly if the web is dragged over a number of such supports, the consequent injury to the material manifests itself not as a uniform diminution of gauge, but as variations of gauge which are irregularly distributed over the entire length and breadth of the material produced. The thickness of plasticized polyvinyl acetal stock used in the manufacture of laminated glass is ordinarily 0.0015 of an inch and the total tolerance permitted is not more than 0.001 of an inch and the gauge must not vary more than 0.0005 in any 0.5 of an inch. Consequently the methods and machines heretofore employed in the manufacture of sheets or webs from cellulose esters, such as cellulose acetate or nitrate, have proved impractical for the formation of similar sheets or webs from plasticized polyvinyl acetal resin. In fact, the difficulty of obtaining satisfactory gauge uniformly has seriously retarded the commercial use of plasticized polyvinyl acetal resin as an interleaf for a safety glass. These difficulties have been overcome in large part (1) by mixing the polyvinyl acetal resin with compatible plasticizers but without volatile solvent liquids as described in the co-pending application of Gustavus J. Esselen and Elmer R. Derby, Serial No. 79,717, filed May 14, 1936, and (2) by extruding the plastic through a straight slot die, one lip of which is formed by the surface of a roll which is moved at a rate such as to exert a slight pull upon the stock as extruded as described in the co-pending application of Elmer R. Derby and Frederic A. Parkhurst, Serial No. 142,352, filed August 30, 1937.

The present invention contemplates an improved apparatus for forming a web of plastic material, such as polyvinyl acetal resin, whereby even greater accuracy in gauge thickness may be obtained. The apparatus of the invention is suitable for the practice of the method described in the co-pending application of Gustavus J. Esselen, Serial No. 193,717 filed March 3, 1938.

In accordance with my present invention the plasticized polyvinyl acetal resin is heated to substantial fluidity and is deposited in a uniform layer on the surface of an endless polished metal belt, the portion of the belt which receives the material being heated to substantially the temperature of the material. To effect uniformity of the deposited layer an extrusion die is associated with the metal belt, this die being so constructed that one lip of the die is substantially in contact with the surface of the belt, while the other lip of the die is spaced from the surface of the belt a distance sufficient to produce a layer of the required thickness. This construction is such that the layer of stock on the belt is in a state of repose and is not subjected to any internal stresses as a result of its formation into a continuous web. Subsequently, the metal belt is sharply cooled or chilled, the cooling being to a temperature at which the stock adheres only slightly to the metal belt so that it can be removed therefrom without being subjected to any substantial pulling strains which will disturb the state of repose in which it has been deposited on the belt. It will, therefore, be seen that my improved apparatus forms the extremly tacky rubbery material into a continuous sheet or web without subjecting it to any substantial pull or strain and that, consequently, a sheet is produced which is internally in a state of repose and therefore is much better adapted to the purposes for which it is intended.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation and it is not intended to limit the invention claimed herein beyond the requirements of the prior art.

The invention will be more clearly understood from the following description in conjunction with the accompanying drawing in which the single figure is a longitudinal sectional elevational view of an apparatus embodying the invention.

The apparatus illustrated in the accompanying drawing comprises a frame 10 supporting an extrusion die 11. Vertically extending frame portions 12, spaced transversely of the apparatus, extend upward from the base of the frame 10 to the casing of the die 11. The upper and lower walls 13 and 14 respectively of the die 11 are shaped to provide a tapered passage 15 for plastic material and are provided with passages 16 for the circulation of a hot fluid to heat the plastic material to the desired temperature. A projection 20 extends forwardly from the opposite sides of the casing of the die 11 and each is provided with a bearing for rotatably supporting a shaft 21. A gear 22 is fixed upon the shaft 21 and meshes with a gear 23 fixed upon a shaft 24 which is rotated from any suitable source of power through gear reduction mechanism 16. A roll 25 is fixed upon the shaft 21 between the projections 20 and is provided with a chamber 26 to receive a hot fluid for heating the roll to the desired temperature.

Transversely spaced arms 35 are pivotally carried at one end upon the shaft 21 and for this purpose each is provided with a cylindrical bearing near one end adapted to surround and engage the shaft 21. The other end of each of the arms 35 is formed with a bearing 37 for rotatably supporting a shaft 40. A roll 45 is mounted upon the shaft 40 to receive an endless metal belt 27 which passes over and is driven by the roll 25 in a counterclockwise direction. A plate 60 extends between and is secured to the arms 35 and is provided with passages 61 for the circulation of a cooling fluid.

The roll 25 is mounted so that its outer surface is spaced from the end of the wall 14 of the die 11 an amount to permit the passage therebetween of the endless metal belt 27 in sliding engagement with the end of the wall 14. A plate 28 is adjustably secured upon the end of the wall 13 by bolts 29 passing through elongated slots 30 in the plate and engaging the wall 13. The plate 28 may be adjusted by screws 31 so that its edge is spaced from the surface of the belt 27 an amount corresponding to the thickness or gauge of the web of plastic material to be produced. Thus, the edge of the plate 28 forms one lip of a straight slot orifice, the other lip of which is formed by the surface of the metal belt 27.

An idler roll 32 is rotatably mounted in bearings in the projections 20 with its surface spaced from the surface of the belt 27 a distance corresponding to the thickness or gauge of the web to be produced. An endless belt 65 passes around a roll 66 which extends between and is mounted in suitable bearings in the frame portions 12 and also passes around a roll 67, the position of which may be adjusted so as to bring the belt 65 in predetermined desired relations to the roll 45.

In the operation of the apparatus hot fluid is circulated through the passages 16 and through the chamber 26 in the roll 25. At the same time a cooling fluid is circulated through the passages 61 in the plate 60. The heated plastic material is forced under pressure through the passage 15 and thence through the slot orifice between the plate 28 and the surface of the belt 27 and is deposited upon the latter in the form of a continuous web W. The roll 25 is positively driven in a counter-clockwise direction so as to move the belt 27 in the same direction. The web of plastic material W deposited upon the surface of the belt 27 passes under the roll 32 and is carried by the belt 27 toward the belt 65 which removes the web W from the belt 27 and carries it away from the apparatus. The belt 27 is moved at such a rate as to exert no pull upon the web as it is extruded. When the metal belt 27 engages the roll 25 it becomes heated and when it passes over the plate 60 it is cooled.

The heated portion of the belt 27 is maintained at about the temperature of the substantially fluid stock as it leaves the orifice of the extrusion die 15 and therefore the stock is internally in a state of repose. As the same portion of the belt passes over the cooling plate 60 the web is cooled sufficiently so that it no longer adheres strongly to the belt and may be taken off without subjecting it to forces which set up internal stresses.

Even if the stock is not entirely fluid when it leaves the orifice of the extrusion die so that it may have some internal stresses these internal stresses are eliminated and a state of repose is established provided the temperature of the hot portion of the belt is sufficiently high.

The period during which the web is opposite the heated roll 25 can be controlled by adjusting the position of the arms 35 carrying the roll 45. Thus, it will be noted that when the arms 35 are positioned so that the belt 27 is in the dotted line position A, the web of plastic material will be opposite the heated roll 25 from the time the web is discharged from the orifice until it reaches the point b whereas when the belt 27 is in the dotted line position C, the web of plastic material will be in contact with the heated roll 25 until it reaches the point d. It will be understood, of course, that whenever the arms 35 are adjusted, the position of the belt 65 must also be adjusted so as to be properly positioned to remove the web of plastic material from the belt 27.

What I claim is:

1. In an apparatus for forming a web from plastic material and in combination, pressure extrusion means provided with heating means for depositing a layer of heated material to form a web of uniform thickness, a single endless belt to receive the web, means for supporting and heating the belt at and adjacent the point of deposit, and cooling means spaced apart from the heating means for cooling the belt as it passes over said cooling means.

2. In an apparatus for forming a web from plastic material and in combination, a pressure extrusion die and a single endless metal belt mounted on rotating surfaces only associated therewith, one lip of the die being substantially in contact with the surface of the belt and the other being spaced apart therefrom sufficiently to form a layer of material of desired thickness on the belt, means for heating the extrusion die, means for supporting and heating the belt at and adjacent the point of deposit, and means spaced apart from the heating means for cooling the belt after it has passed over the heating means.

3. In an apparatus for forming a web from plastic material, in combination, a pair of rolls, an endless belt passing around said rolls, means for moving said belt at a desired rate, means positioned between said rolls for cooling said belt, a supply casing having a passage therethrough and provided with pressure and heating means, the end of one wall of said passage being positioned adjacent the surface of one of said rolls and close enough to the belt passing over the latter to prevent egress of plastic material between the belt and the casing on that side of the passage, the opposite wall of said passage being spaced from said belt to form with the latter an orifice determining the thickness of the web to be formed, means for heating said belt adjacent said orifice, and means for removing said web from said belt after the web has passed over said cool region.

4. In an extrusion apparatus for forming a web of plastic material, in combination, a driven roll, a frame, a second roll rotatably carried by said frame, an endless belt connecting and passing around said rolls, means carried by the frame and positioned between said rolls for cooling said belt, a supply casing having a passage therethrough and provided with pressure and heating means, the end of one wall of said passage being positioned adjacent the surface of said driven roll and close enough to the belt passing over the latter to prevent egress of plastic material between the belt and the casing on that side of the passage, the opposite wall of said passage being spaced from said belt to form with the latter an orifice determining the thickness of the web to be formed, means for heating said driven roll to heat the portion of the belt adjacent said orifice, means for adjusting the position of said frame to control the length of the portion of said belt which engages said driven roll after passing said orifice and before reaching said cooling means, and means for removing said web from said belt after the web has passed over said cooling means.

5. In an apparatus for producing sheet material, in combination, a driven roll, a frame, an idler roll rotatably carried by said frame, an endless belt passing around said rolls, a plate positioned between said rolls adjacent said belt, a supply casing having a passage therethrough and provided with pressure and heating means, the end of one wall of said passage being positioned adjacent the surface of said driven roll and close enough to the belt passing over the latter to prevent egress of plastic material between the belt and the casing on that side of the passage, the opposite wall of said passage being spaced from said belt to form with the latter an orifice determining the thickness of the web to be formed, means for heating the belt adjacent said orifice, means for cooling said plate to cool the adjacent portion of said belt, and means for adjusting the position of said frame to control the length of the portion of said belt which engages said driven roll after passing said orifice and before reaching said cooling means.

6. In an apparatus for producing sheet material, in combination, a driven roll, a frame, an idler roll rotatably carried by said frame, an endless belt passing around said rolls, a plate positioned between said rolls adjacent said belt, a supply casing having a passage therethrough and provided with pressure and heating means, the end of one wall of said passage being positioned adjacent the surface of said driven roll and close enough to the belt passing over the latter to prevent egress of plastic material between the belt and the casing on that side of the passage, the opposite wall of said passage being spaced from said belt to form with the latter an orifice determining the thickness of the web to be formed, means for heating the belt adjacent said orifice, and means for cooling said plate.

7. In an apparatus for producing sheet material, in combination, an ejection nozzle which determines the thickness of said sheet material provided with pressure and heating means, a single endless belt adjacent said nozzle, means for heating the surface of the belt at an area adjacent the nozzle, means for cooling an area of the belt succeeding the heated area, and means for stripping the web from the belt after the material passes the cooling means.

8. In an apparatus for producing sheet material, in combination, a pair of spaced rolls, an endless belt passing around said rolls, means for moving said belt at a desired rate, an extrusion nozzle provided with pressure and heating means for depositing a web of plastic material upon said belt, means for removing said web from said belt, means for heating said belt adjacent said nozzle and for cooling said belt adjacent said removing means, and means for controlling the length of the portion of said belt which is heated after passing said extrusion nozzle and before reaching said cooling means.

FREDERIC A. PARKHURST.